United States Patent [19]

Miller

[11] 3,896,250

[45] July 22, 1975

[54] FLAMEPROOFING OF FABRICS
[75] Inventor: George T. Miller, Lewiston, N.Y.
[73] Assignee: Hooker Chemicals & Plastics Corporation, Niagara Falls, N.Y.
[22] Filed: June 18, 1973
[21] Appl. No.: 371,335

Related U.S. Application Data
[63] Continuation-in-part of Ser. No. 361,706, May 18, 1973.

[52] U.S. Cl............... 428/272; 106/15 FP; 252/8.1; 427/394; 428/290; 428/921
[51] Int. Cl.$^2$............................................. C09D 5/18
[58] Field of Search............ 117/136, 137, 138.8 N; 106/15 FP; 252/8.1; 260/953

[56] References Cited
UNITED STATES PATENTS

| | | | |
|---|---|---|---|
| 3,369,060 | 2/1968 | Pelletier et al..................... | 117/136 |
| 3,398,019 | 8/1968 | Langguth et al..................... | 252/8.1 |
| 3,436,250 | 4/1969 | Kyoto et al........................ | 117/136 |

*Primary Examiner*—Charles E. Van Horn
*Assistant Examiner*—Michael W. Ball
*Attorney, Agent, or Firm*—Peter F. Casella; William J. Crossetta, Jr.

[57] ABSTRACT

Normally flammable textile fabrics composed of polyamides such as polyhexamethylene adipamides, polycaproamides, poly(m-phenyleneisophthalamides) and the like, are rendered highly flameproof by the intimate association therewith of a flameproofing amount of the reaction product of an acid ammonium phosphate and an alkylene oxide, e.g., ethylene oxide. Amounts of said reaction product of at least, and preferably in excess of 0.5 percent OWF (on the weight of the fiber) increase the Oxygen Index of the treated fabrics to over 40. Preferably the reaction product of ethylene oxide and diammonium acid phosphate is used and the treated fabrics are non-corrosive, non-irritating in nature, and have a pleasant hand.

19 Claims, No Drawings

3,896,250

FLAMEPROOFING OF FABRICS

CROSS REFERENCE TO RELATED APPLICATION

This application is a continuation-in-part of U.S. application Ser. No. 361,706 filed May 18, 1973.

FIELD OF INVENTION

This invention relates to improvements in the flameproofing of normally flammable fabrics. More particularly it relates to the treatment of normally flammable fabrics composed of certain synthetic polymers and especially it relates to fabrics composed of poly(m-phenyleneisophthalamides) which have been treated to increase the Oxygen Index of said fabrics to at least 40.

BACKGROUND OF THE INVENTION

Apparel for use in applications where under emergency conditions a hazardous thermal environment might exist should satisfy the following minimum requirements.

a. The fabric from which the apparel is made should be resistant to burning, melting or disintegration on exposure to open flames or elevated temperatures.

b. The fabric should possess good dimensional stability on exposure to elevated thermal conditions since large thermal shrinkages tend to restrict mobility of the wearer.

c. The apparel should function as an effective thermal barrier in order to prevent severe skin burns, and d. The garments should be durable, non-irritating, and comfortable to encourage their use.

It is known to treat normally flammable textile materials, of both natural and synthetic nature, with chemicals such as triammonium phosphate, tetrakis(hydroxymethyl) phosphonium oxides and polymers thereof, and the like to render them fire retardant. Such treatments while effective for rendering fabrics fire retardant under normal conditions of use, such as fabrics designed for use as curtains, rugs, sweaters and the like, are not satisfactory for use under emergency or highly hazardous conditions as in aviators' flying suits or apparel designed for use in oxygen enriched atmospheres.

Synthetic materials, such as polybenzimidazoles and polyamides such as poly(m-phenyleneisophthalamides) which exhibit improved heat resistance compared to other synthetics such as polypropylene and polyamides such as polyhexamethyleneadipamides and polycaproamides are known and these improved fibers have replaced the more conventional fire retardant materials in many special applications. In copending application ser. No. 230,999, filed March 1, 1972, now abandoned it is disclosed that normally flammable fabrics such as polypropylene and polyamides could be rendered flameproof by the intimate association therewith of a flameproofing amount of a phosphoric acid. Such treated fabrics, although substantially improved with respect to their resistance to the propagation of flames, are somewhat corrosive to metals and tend to cause irritation to the skin of those wearing clothing fabricated from such treated fabrics. In copending application Ser. No. 337,349, filed Mar. 2, 1973, it was disclosed that normally flammable polyamide fabrics could be rendered flameproof and non-irritating by the intimate association therewith of a flameproofing amount of an ammonium acid phosphate. Such treated fabrics although substantially improved with respect to their non-irritating character tend to deposit crystals of the ammonium phosphate, unless great care is observed in the application thereof, and thereby affect the hand of the treated fabric. Accordingly a need still exists for a fiber with thermal characteristics superior to those of the aforementioned fibers, which are non corrosive and non-irritating in character, and which have a pleasant hand.

OBJECTS OF THE INVENTION

It is, therefore, a principal object of this invention to devise improved flameproofed textile fabrics comprising normally flammable synthetic materials.

Another object is to provide a process for treating normally flammable synthetic materials to render them non-corrosive and nonirritating as well as flameproof.

A particular object is to devise compositions of normally flammable synthetic materials comprising an effective flameproofing amount of a reaction product of an acid ammonium phosphate and an alkylene oxide intimately associated therewith.

These and other objects of the present invention will be obvious from the following description.

BRIEF SUMMARY OF THE INVENTION

In accordance with the present invention, normally flammable fabrics of synthetic polymers are rendered highly flameproof by intimately admixing the fabric with an effective flameproofing amount of a reaction product of an acid ammonium phosphate and an alkylene oxide. The resultant treated fabric is not only surprisingly five proof, non-corrosive, non-irritating in character, but also has a pleasant hand.

By "effective flameproofing amount" is meant that amount of the said reaction product which suffices to increase the Oxygen Index of the treated material to 40 or above.

By the term "Oxygen Index" it is intended to define the percentage concentration of oxygen in a mixture of oxygen and nitrogen which will maintain equilibrium burning conditions, i.e., the heat produced during combustion just balances the heat lost to the surroundings. Physically, the Oxygen Index is the lowest concentration of oxygen, in an atmosphere of oxygen and nitrogen, which will support sustained combustion of the material and is calculated from the following equation $$\text{Oxygen Index} = \frac{100 \times O_2}{O_2 + N_2}$$

where $O_2$ is the oxygen concentration at equilibrium and $N_2$ is the associated nitrogen concentration. (See "The Oxygen Flame Flammability Test," J. L. Isaacs, J. Fire and Flammability, Vol. 1 (January 1970) page 36 et seq.)

In practice of the present invention, the materials treated may be formed in whole or in part of the normally flammable synthetic polymer material and may be in various forms including yard or sheet goods, as well as various finished articles, such as articles of clothing including coats, shirts, trousers, skirts, jump suits, gloves, and the like. The materials may be woven, non woven, knitted, and the like. Accordingly although, hereinafter primary reference will be made to the treatment of fibrous woven synthetic polymer yard goods, this is not to be taken as a limitation as other forms of synthetic polymer materials, such as non-woven, films, foils, sheets, fibers and yarns, may, in many instances, be utilized as the materials treated in accordance with the present invention.

DETAILED DESCRIPTION OF THE INVENTION

In accordance with a preferred mode of carrying out the present invention normally flammable synthetic polymers, such as polycaproamides, polyhexamethylene adipamides and poly(m-phenyleneisophthalamides) are intimately associated with an effective flameproofing amount of reaction product of aqueous acid ammonium phosphate, preferably diammonium acid phosphate, an and alkylene oxide. Preferably the polymer material is associated with at least about 1.0 percent and especially with from about 5 to 15 percent by weight or more of the reaction product.

The flameproofing treatment of this invention can be accomplished by several means. For example the synthetic material, in the fibrous or woven condition, can be immersed, padded, sprayed, or dipped in or with an aqueous solution of said reaction product, and the thoroughly wetted material dried to remove excess moisture. The treated fabric may be heated to below the decomposition point of the synthetic polymer without significant effect on the treatment.

The reaction product used in the process of this invention is a complex mixture of unknown composition and is obtained by reacting an alkylene oxide, e.g., ethylene oxide, 1,2-propylene oxide, 2,3-butylene oxide and the like, with an aqueous solution of an acid ammonium phosphate, such as diammonium acid ortho-phosphate, monoammonium diacid ortho-phosphate, mixtures thereof and the like.

The preferred reactants are diammonium acid phosphate ("DAP"), because of its general availability, overall effectiveness and low cost, and ethylene oxide because of its general overall effectiveness and low cost.

To carry out the preparation of the reaction product, an aqueous solution of the acid ammonium phosphate containing from about 5 to about 40 percent by weight of acid ammonium phosphate is placed in a suitable reactor which may be equipped with an agitator and the alkylene oxide, preferably ethylene oxide bubbled into the mass. The initial exothermic reaction is controlled by cooling the mixture and/or by adjusting the rate of addition of the alkylene oxide. The reaction temperature is adjusted to from about 0° to about 100° centigrade and preferably 10°-80°C and an amount of alkylene oxide which is from about one half to one and one half times the weight of the acid ammonium phosphate, preferably from about one to about one and one half times the weight of said acid salt is added. The resultant solution is permitted to stand for at least about eight hours, and preferably for about 10 to 24 hours in a closed container. Thereafter the resultant solution can be used directly or if desired, it may be neutralized to a pH of about 6.8 to about 7.5 with ammonia or other alkaline reacting substances.

The resulting reaction product is a rather complex mixture which does not crystallize or if crystals do form they are rather minimal in amount. The product is substantially neutral or can be rendered neutral in situ or after application to the fiber. Such a composition is imminently advantageous since it can be more effectively applied and distributed throughout the material treated than a composition which crystallizes on drying and thus deposits isolated crystals on the material and thereby affects the hand of the treated material.

Although I do not wish to be bound by any theory or explanation of the reactions which take place during the formation of the reaction product of the aqueous acid ammonium phosphate and alkylene oxide, it is believed that when using, for example, ethylene oxide and diammonium acid phosphate, a major amount of a hydroxyethyl ester of ammonium acid phosphate is formed together with lesser amounts of ethylene glycol and other phosphorus containing organic compounds. Also there may be more or less amounts of unreacted phosphate ions present. Such a complex mixture, fortuitously resists crystallization even when dried to a very low water content and thus provides not only an effective flameproofing agent, but also a non-irritating (i.e. non-acidic) agent which can be applied to fibrous textiles and dried whereon without affecting the hand of the treated material.

Although the flameproofing treatment of this invention initially results in fabrics having an Oxygen Index of at least 40, this value has been found to decrease as a result of repeated washing of the treated fabric. It has been found, as disclosed in the above noted copending applications, that the treatment in accordance with this invention can be stabilized, that is flameproofing treatment can be rendered more fast to washing, by applying to the treated material a coating of synthetic resin material, having an Oxygen Index of at least 40. Such a resin is for example polyvinylidene chloride. Perfluorinated organic polymers, such as Teflon, can be used also.

It has thus been found that by dipping, immersing, spraying, roller coating or otherwise applying to the surface of a treated synthetic polymer material of this invention a solvent solution of polyvinylidene chloride or the like polymer, and evaporating the solvent, a coating of the resin is applied to the surface of the treated polymer material and the flameproofing character of the treated material is thereby rendered more fast to washing.

Solvents suitable for use in this manner, include by way of examples such solvents as dioxane, cyclohexanone, tetrahydrofuran, dimethylformamide and ethylacetate.

The following examples will illustrate the present invention. Parts and percentages are by weight and temperatures are given in degrees centigrade unless otherwise specified.

EXAMPLE I

A. Preparation of Reaction Product of 10% Aqueous Diammonium Acid Phosphate and Ethylene Oxide To a solution of 50 parts of diammonium acid phosphate in 450 parts of water at ambient temperature about 50 parts of ethylene oxide were added through a fitted glass gas disperser. The first 30 parts of the ethylene oxide were rapidly dissolved as evidenced by a haze of fine bubbles around the disperser which rapidly disappeared. Thereafter the bubble size gradually increased until finally large bubbles reached the surface of the solution and the rate of addition had to be decreased. The solution temperature increased to 32° during the addition which was made over a period of about 12 minutes.

B. Effect of Temperature

The procedure of Part A above was repeated except that the addition of ethylene oxide was made to a warm (40°–42°) solution of diammonium acid phosphate. The temperature of the solution rose to about 48° and then decreased to about 45°. Only about 30 parts of ethylene oxide could be dissolved in the solution in a 30 minute period.

Samples of both products from Parts A and B were placed on metal discs and then evaporated to dryness in an oven. Both solutions crystalled as though no ethylene oxide was present.

All but 50 parts of each of the solutions was placed in stoppered bottles and permitted to stand for about 16 hours at ambient temperature. The remaining 50 part portions of each of the solutions was placed in an open bottle and these also were left to stand at ambient temperature for about 16 hours.

The solution from Part A which was contained in the stoppered bottle remained clear when placed on a metal disc and the water evaporated in an oven. The solution from Part B in the stoppered bottle formed several crystals but remained fluid when evaporated in the same manner.

Both solutions from Parts A and B which had stood in open bottles were almost completely crystallized and nonfluid when evaporated as above.

These results indicate that the reaction between ethylene oxide and aqueous ammonium acid phosphate as a slow reaction, the ethylene oxide dissolved in the solution gradually reacting over a period of several hours. Further unless confined, the vapor pressure of ethylene oxide is such that it escapes into the atmosphere before it reacts.

EXAMPLE II

A solution of 50 parts of diammonium acid phosphate in 450 parts of water was cooled to about 0° in an ice bath. Ethylene oxide was bubbled into the cooled solution until about 50 parts were added. The ethylene oxide was absorbed rapidly and the temperature of the solution rose to 13°.

A small amount of the resultant solution was placed on a metal plate and then evaporated to dryness. The mass was completely crystalline.

The solution was placed in a stoppered bottle and permitted to stand at ambient temperature for about 24 hours. The solution remained clear and free of crystals. A small portion of the aged solution was placed on a metal plate and evaporated in an oven as previously. The solution did not crystallize and a thick viscous oily mass remained.

EXAMPLE III

Strips measuring 2 1/2 inches by eight inches of a white woven poly(m-phenyleneisophthalamide) fabric were wetted with one of the solutions identified below, by placing about 20 grams of said solution on the strip and spreading the solution over the strip with a stainless steel spatula until substantially complete wetting of the strip was obtained. The wetted strip was dried in an oven. By weighing the strips before treatment and after drying the amount of add-on was determined. Thereafter the Oxygen Index of the treated strips was determined.

The following aqueous solutions were used.

A. A solution of 10 parts of diammonium acid phosphate in 90 parts of water was prepared and to it was added 10 parts of ethylene glycol.

B. A solution of 10 parts of diammonium acid phosphate in 90 parts of water.

C. An aqueous solution prepared by reacting a solution of 50 parts of diammonium acid phosphate in 450 parts of water with about 50 parts of ethylene oxide at 0° to 13° as described in Example 2 above.

D. An aqueous solution prepared as described in Example 2 above but in which 50 parts of monoammonium diacid phosphate were used in place of a like amount of diammonium acid phosphate.

The results of these tests are set out in the following table.

TABLE

| Solution | Add-On % | Oxygen Index | Hand |
|---|---|---|---|
| A | 7.1 | 58 | Very boardy |
| B | 6.5 | 59 | Very boardy |
| C | 12.7 | 59 | Excellent |
| D | 8 | 58 | Excellent |

As indicated above, the treated strips were all highly flame proof (O.I. of untreated material is 28±1). However the strips which were treated with Solutions A and B were very boardy and coarse to the touch, while the strips which were treated with Solutions C and D, i.e., in accordance with the process of the present invention, had a smooth pleasant hand, indistinguishable from the untreated fabric, and were non-irritating to the skin.

EXAMPLE IV

The stiffness of the fabrics treated in accordance with the present invention was determined according to the ASTM D-1388-64 (Option A - Cantilever Test). For comparison, fabric treated with solutions A and B of Example 3 above were submitted to this test also, as well as a sample of the untreated fabric. The results of these tests are set out in the following table. In this test, one inch wide strips of woven textile fabric were used.

TABLE

| Fabric Treatment | Add-On % | Wt. Mg/cm² | Over Hang cm | Bending Length cm | Flexural Rigidity |
|---|---|---|---|---|---|
| Untreated(Control) | — | 21.03 | 6.0 | 3.0 | 568 |
| 10% DAP¹ | 6.5 | 22.4 | 8.4 | 4.2 | 1660 |
| 10% DAP+EG² | 7.1 | 22.5 | 8.6 | 4.3 | 1789 |
| 10% MAP+EO³ | 8.0 | 22.7 | 6.7 | 3.35 | 853 |
| 10% DAP+EO | 12.7 | 23.7 | 6.2 | 3.1 | 706 |
| H₃PO₄+EO+NH₄OH⁴ | 8.5 | 22.8 | 6.0 | 3.0 | 616 |

LEGEND 1 - Diammonium acid phosphate

2 - Ethylene glycol
3 - MAP - Monoammonium diacid phosphate
EO - Ethylene Oxide
4 - Strip prepared according to process disclosed in Example II of copending application Ser. No. 361,706 filed May 18, 1973.

These results indicate the excellent hand, i.e., lack of stiffness, of the material treated in accordance with this invention. According to ASTM D-1388-64, the precision of this test is such that differences of 10% in flexural rigidity can just be detected subjectively. Thus the values obtained indicate that the fabric treated with diammonium acid phosphate alone and with DAP and ethylene glycol are substantially stiffer than the control untreated material, while that fabric treated in accordance with the invention are but slightly more stiff than the control.

The invention has been described in the above specification and illustrated by reference to specific embodiments in the illustrative examples. However it is to be understood that it is not to be so limited since changes and alterations in the specific details disclosed hereinabove may be made without departing from the scope or spirit of the invention disclosed herein.

What is claimed is:

1. Flameproofed synthetic fibrous material comprising a normally flammable synthetic material selected from the group consisting of poly(hexamethylene adipamide), polycaproamide, and poly(m-phenyleneisophthalamide) which material contains a flame retardant amount of a reaction product of an aqueous solution of an acid ammonium phosphate and an alkylene oxide, said reaction product having been obtained by reacting at a temperature from about 0° to about 100° centigrade, an aqueous solution of an acid ammonium phosphate containing from about 5 to about 40 weight percent of an acid ammonium phosphate selected from the group consisting of diammonium acid ortho-phosphate, mono ammonium diacid ortho-phosphates and mixtures thereof with an amount of at least one alkylene oxide selected from the group consisting of ethylene oxide, propylene oxide and butylene oxide which is about 0.5 to 1.5 times the weight of said acid ammonium phosphate.

2. flameproofed synthetic fibrous material as claimed in claim 1 wherein the material comprises at least 1.0 percent by weight of said reaction product.

3. Flameproofed synthetic fibrous material as claimed in claim 1 wherein the acid ammonium phosphate is diammonium acid phosphate.

4. Flameproof synthetic fibrous material as claimed in claim 1 wherein the alkylene oxide is ethylene oxide.

5. Flameproofed synthetic material as claimed in claim 1 wherein the synthetic material is poly(m-phenyleneisophthalamide).

6. Flameproof synthetic fibrous material as claimed in claim 2 wherein the material comprises from about 5.0 to about 15 percent by weight of said reaction product.

7. Flameproofed synthetic material as claimed in claim 2 wherein the synthetic material is poly(m-phenyleneisophthalamide).

8. Flameproofed synthetic fibrous material as claimed in claim 3 wherein the synthetic material is poly(m-phenyleneisophthalamide), the acid ammonium phosphate is diammonium acid phosphate, and the alkylene oxide is ethylene oxide.

9. The process which comprises the steps of treating a normally flammable synthetic polymer material selected from the group consisting of poly(hexamethylene adipamide), polycaproamide, and poly(m-phenyleneisophthalamide) with a reaction product of an aqueous solution of an acid ammonium phosphate and an alkylene oxide, said reaction product having been obtained by reacting at a temperature from about 0° to about 100° centigrade, an aqueous solution of an acid ammonium phosphate containing from about 5 to about 40 weight percent of an acid ammonium phosphate selected from the group consisting of diammonium acid orthophosphate, mono ammonium diacid ortho-phosphates and mixtures thereof with an amount of at least one alkylene oxide selected from the group consisting of ethylene oxide, propylene oxide and butylene oxide which is about 0.5 to 1.5 times the weight of said acid ammonium phosphate to deposit a flame retarding amount of said reaction product on the polymer material.

10. The process as described in claim 9 wherein the polymer is poly(m-phenyleneisophthalamide).

11. The process as described in claim 10 wherein the treated material has an Oxygen Index of at least about 40.

12. The process as described in claim 11 wherein the treated material has an Oxygen Index of about 55 to about 60.

13. The process which comprises the steps of
  a. applying to a normally flammable synthetic polymer material selected from the group consisting of polyhexamethylene adipamide, polycaproamide, and poly(m-phenyleneisophthalamide) a fire retardant amount of a reaction product of an aqueous solution of an acid ammonium phosphate acid and an alkylene oxide, said reaction product having been obtained by reacting at a temperature from about 0° to about 100°C an aqueous solution of an acid ammonium phosphate containing from about 5 to about 40 weight percent of an acid ammonium phosphate selected from the group consisting of diammonium acid ortho-phosphate, monoammonium acid ortho phosphates and mixtures thereof with an amount of at least one alkylene oxide selected from the group consisting of ethylene oxide, propylene oxide and butylene oxide which is about 0.5 to 1.5 times the weight of said acid ammonium phosphate, and
  b. drying the treated synthetic polymer material.

14. The process as claimed in claim 13 wherein the normally flammable synthetic polymer material is poly(m-phenyleneisophthalamide).

15. The process of claim 13 wherein the treated material contains about 5.0 to about 15 percent by weight of the reaction product.

16. The process as claimed in claim 14 wherein the aqueous solution is a solution of diammonium acid phosphate containing about 10 percent of said salt.

17. The process of claim 14 wherein the aqueous solution is a solution of monoammonium diacid phosphate containing about 10 percent of said salt.

18. The process as claimed in claim 15 wherein the alkylene oxide is ethylene oxide.

19. The process of claim 16 wherein the amount of ethylene oxide reacted to about 1 to 1½ times the weight of the diammonium acid phosphate present.

* * * * *